(12) United States Patent
Muthu et al.

(10) Patent No.: US 12,493,897 B2
(45) Date of Patent: Dec. 9, 2025

(54) ARTIFICIAL INTELLIGENCE-BASED METHODS AND SYSTEMS FOR GENERATING RESPONSES, RATINGS, AND FEEDBACK OF SOCIAL MEDIA MARKETING CAMPAIGNS

(71) Applicant: Intuit, Inc., Mountain View, CA (US)

(72) Inventors: Malathy Muthu, The Woodlands, TX (US); Roger C. Meike, Redwood City, CA (US); Alexis Kim Tymofiev, Santa Clara, CA (US); Andrew Holmes, Denton, TX (US); Courtney M. Ferguson, Greenville, NC (US); Hannah Anokye, San Francisco, CA (US); Shaozhuo Jia, Mountain View, CA (US); Mohsin Akhtar Malik, Buffalo, NY (US); Ryan Rich, Oceanside, CA (US); Xianzhi Hu, South San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/651,553

(22) Filed: Apr. 30, 2024

(65) Prior Publication Data
US 2025/0335955 A1    Oct. 30, 2025

(51) Int. Cl.
G06Q 30/0242    (2023.01)
G06N 3/0895    (2023.01)

(52) U.S. Cl.
CPC ....... *G06Q 30/0242* (2013.01); *G06N 3/0895* (2023.01)

(58) Field of Classification Search
CPC .................. G06Q 30/0242; G06N 3/0895
See application file for complete search history.

(56) References Cited

U.S. PATENT DOCUMENTS

| 2024/0029103 A1* | 1/2024 | Myers | G06Q 30/0244 |
| 2025/0045802 A1* | 2/2025 | Farseev | G06Q 30/0269 |

OTHER PUBLICATIONS

Leveraging Machine Learning Algorithms and Natural Language Processing for Enhanced AI-Driven Influencer Campaign Analytics vol. 11 No. 10 (2022): European Advanced AI Journal vol. 11 Issue: 10 Amit Sharma, Neha Patel, Rajesh Gupta (Year: 2022).*

* cited by examiner

*Primary Examiner* — Alexandru Cirnu
(74) *Attorney, Agent, or Firm* — Dinsmore & Shohl LLP

(57) ABSTRACT

Certain aspects provide a computer-implemented method for evaluating social media marketing campaigns using artificial intelligence (AI). The method comprises using a large language model (LLM) to generate a plurality of AI personas. Each AI persona represents a different segment of a target audience of a marketing campaign. The method uses a transformer model, a decision tree-based model, and a natural language processing (NLP) model to predict a response, a rating, and a feedback to the marketing campaign for each AI persona that represents a different segment of the target audience. The predicted responses, ratings, and feedback for the AI personas that represent different segments of the target audience are aggregated to form an evaluation of the marketing campaign for each segment of the target audience. The method sends the evaluation of the marketing campaign to a user.

18 Claims, 16 Drawing Sheets

| AI persona output |
|---|
| {<br>"Name": "Emily",<br>"Role": "Young professional",<br>"Demographics": "Age: 25, Gender: Female, Occupation: Marketing executive, Marital status: Single, Education level: Bachelor's degree",<br>"Behavior": "Values unique and high-quality jewelry pieces, prefers online shopping for convenience and accessibility.",<br>} |

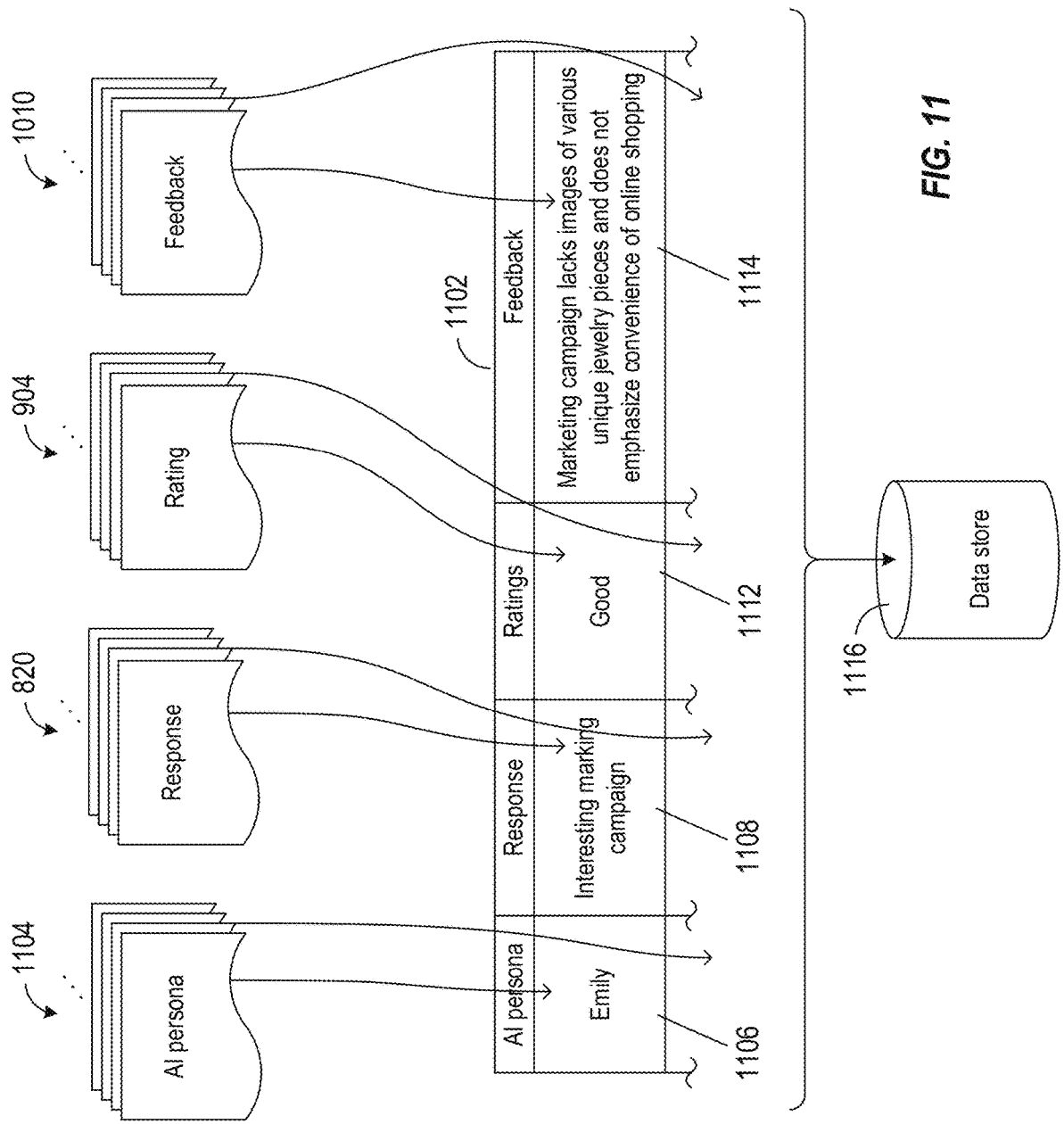

*FIG. 12B*

1238 —
```
def persona_reaction(post_text, personas, company_name):
    reaction_format_string = f'{"Persona1": {"Name":persona_name, "Reaction":text,
"Sentiment":starvalue1-5, "Forwardability":starvalue1-5}...} where starvalue1-5 is a
number from 1-5, 1 being worst and 5 being best'
    system_prompt = f"You answer the prompt below multiple times, once in character of
each of the personas described in the JSON below as a customer of
{company_name}.\nJSON:\n{personas}\nYour response should be in the following
JSON format: {reaction_format_string}"
```

1236 ─

1228 — AI persona responses to the marketing campaign

1220 — Description of an expert AI persona

1234 — Engineered persona reaction

1226 — Engineered advisor reaction

Generative AI model 1202

1240 — Expert advice

1116 — Data store

1242 —
\*\*Leverage Positive Feedback\*\*: Paula, the passionate collector, loves your work. Utilize such positive responses in your marketing strategy. For example, you could create a testimonial-themed post showcasing real customer feedback to build trust and authenticity with your audience.

1228 —
```
def advisor_reaction(post_text, reactions, advisor, company_name):
    system_prompt = f"You are an expert in small business and social media
advising a company named {company_name} as describe in the JSON below:
{advisor}"
```

1230 —
```
    prompt = f"The following is a media post from {company_name} Media Post:
"{post_text}"\nCustomers had reacted with the quotes below. Reactions:
{reactions}\nWhat is your advice to {company_name}? What is you reaction to
both the post and the customer reactions? Is there action to take to make the
media post more interesting or relevant to customers? Your response should
address the business owner directly.  Your response should be direct, honest,
succinct, specific and actionable.'
    return chat_llm(prompt, system_prompt, model)
```

ARTIFICIAL INTELLIGENCE-BASED METHODS AND SYSTEMS FOR GENERATING RESPONSES, RATINGS, AND FEEDBACK OF SOCIAL MEDIA MARKETING CAMPAIGNS

BACKGROUND

Field

Aspects of the present disclosure relate to machine learning, and in particular, to artificial intelligence-based methods and systems for generating responses, ratings, and feedback of social media marketing campaigns.

Description of Related Art

To reach the increasing numbers of consumers on social media platforms, such as Instagram®, X, Pinterest®, and Facebook®, businesses invest heavily in creating marketing campaigns that promote brands and advertise products on these platforms. However, traditional methods of creating social media marketing campaigns rely on historical customer purchasing behavior. Such marketing campaigns advertise goods that are similar to the products customers have purchased in the past or advertise goods other customers have purchased in the past based on the assumption that a group of customers who have purchased the same product in the past are interested in purchasing the same products in the future.

Consider, for example, an online jewelry store that offers a variety of styles of handcrafted jewelry for customers to purchase online. Traditional methods of generating social media market campaigns for customers who have purchased jewelry from the store in the past are presented with advertisements for jewelry that are similar to the styles of jewelry the customers have purchased in the past. Customers may also be presented with advertisements for jewelry purchased by other customers who coincidentally purchased the same jewelry in the past. However, such marketing campaigns are often not effective at holding the attention customers that are interested in other styles of jewelry or that do not share a common interest in the same styles of jewelry purchased by other customers, even though they may have coincidentally purchased the same jewelry in the past.

Because typical social media marketing campaigns fail to account for attributes of the market audience other than historical purchasing behavior, creators of social media marketing campaigns cannot predict the effectiveness of a marketing campaign prior to releasing the campaign on social media. As a result, businesses who invest in marketing products and services using traditional methods waste money on creating advertising content that is often ignored by the target audience and may even annoy segments of the target audience by pushing advertisements onto social media platforms that consumers are not interested in.

SUMMARY

Certain aspects provide a computer-implemented method for evaluating social media marketing campaigns using artificial intelligence (AI). The method comprises using a large language model (LLM) to generate a plurality of AI personas. Each AI persona generated with the LLM represents a different segment of a target audience of a marketing campaign. The method uses a transformer model, a decision tree-based model, and a natural language processing (NLP) model to predict a response, a rating, and a feedback to the marketing campaign for each AI persona that represents a different segment of the target audience. The predicted responses, ratings, and feedback for the AI personas that represent different segments of the target audience are aggregated to form an evaluation of the marketing campaign for each segment of the target audience. The method sends the evaluation of the marketing campaign to a user. The evaluation of the marketing campaign is configured to be used by the user to fine-tune the marketing campaign.

Another aspect provides a computer-implemented method for training an AI based system for evaluating social media marketing campaigns. The method trains a LLM to generate a plurality of AI personas based on textual data scraped from websites of online platforms. Each AI persona represents a different segment of a target audience of a marketing campaign. The method trains a transformer model to predict responses to the marketing campaign for each AI persona based on a dataset of user responses to various types of marketing content. The method trains a decision tree-based model to generate a rating for each predicted response based on a dataset of user ratings of various types of marketing content and trains an NLP to generate feedback based on user feedback to responses and ratings of various types of marketing content. The method uses the trained LLM, the transformer model, the decision tree-based model, and the NLP to generate an evaluation of the marketing campaign by different segments of the target audience represented by the AI personas.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 11 depicts an example evaluation formed from the AI personas, responses, ratings, and feedback of the AI personas.

FIGS. 12A-12B depict an example of generating an expert AI persona in social media marketing.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
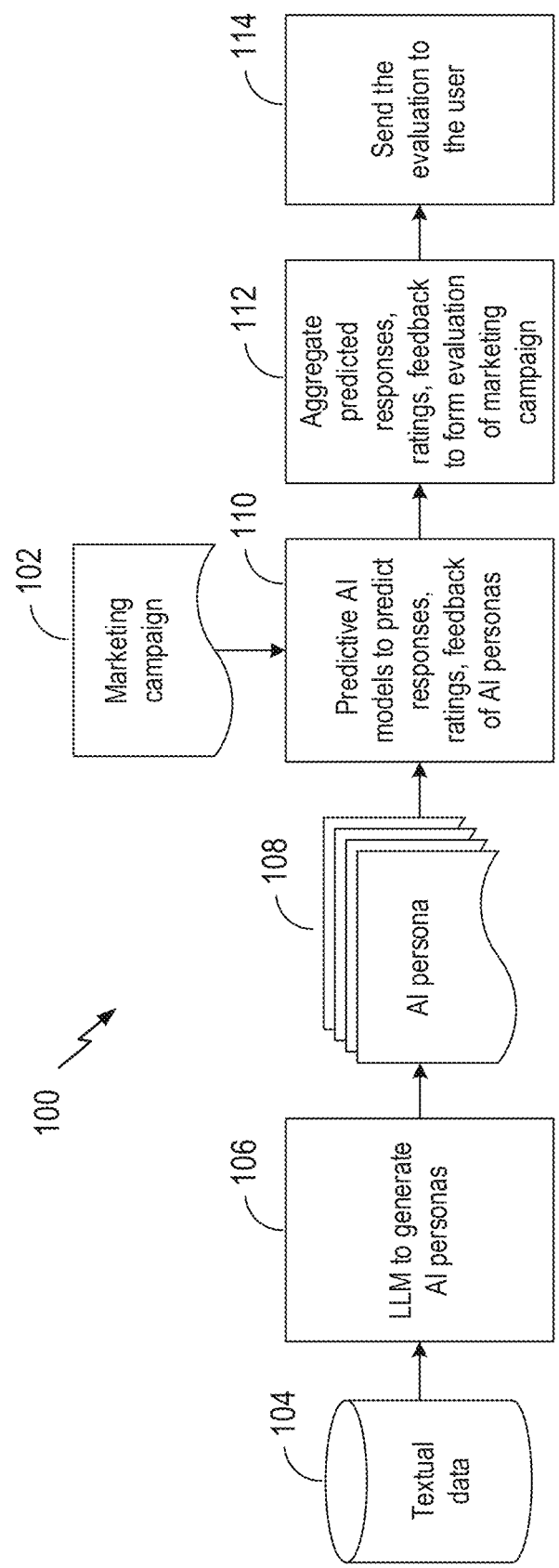
FIG. 1 depicts a high-level implementation of an automated artificial intelligence (AI)-driven method for evaluating a social media market campaign before the market campaign is released on social media.

Traditional methods of creating marketing campaigns for social media platforms depend on historical data that records past purchases by customers. These marketing campaigns are created with the assumption that customers are interested in purchasing products and services that are similar to the products and services that customers have purchased in the past or that groups of customers who have purchased the same products and services in the past have a shared interest in purchasing similar types of products and services in the future. These assumptions about consumer interests are often incorrect because many customers are not interested in purchasing products that are similar to products they have purchased in the past or are not interested in purchasing products others have purchased even though they have coincidentally purchased the same product in the past. As a result, creating and distributing social media marketing campaigns that are based on past purchases or assume similar interest with other shoppers are unreliable and may, in some cases, drive customers away from the business rather than create interest in products and services of actual interest to the customers. Businesses who desire to market products and services on social media cannot rely on historical data to predict how customers will respond to a market campaign.

Embodiments described herein train and use AI models to evaluate a marketing campaign created for a target audience prior to release of the campaign on social media platforms of the target audience. In particular, the AI models use textual data scraped from social media platforms, online forums, online customer reviews, and/or online surveys to generate a plurality of different AI personas, which are salient aspects of the automated methods and systems described herein for evaluating a marketing campaign. Each AI persona represents a different segment, or demographic, of a target audience of the marketing campaign. For example, an AI persona may include the age, gender, occupation, marital status, education level, social interests, and consumer behavior and personal interests of a demographic of the target audience. The AI personas and a marketing campaign are input to the trained AI models to predict how segments of the target audience that correspond to the different AI personas would likely respond to the marketing campaign. These responses of the AI personas to the marketing campaign are aggregated to form an evaluation of the campaign. This evaluation provides a user, such as a business or an advertiser, with an understanding of how each segment of the target audience can be expected to respond to content of the campaign by highlighting strengths and areas of improvement of the campaign. The evaluation of the marketing campaign is sent to the user for display, thereby allowing the user to make changes to the campaign before the campaign is sent to social media platforms of the target audience. This process of creating AI personas and using AI models to predict how different segments of the target audience would respond to the marketing campaign increases the likely of success of the marking campaign and is not performed by advertisers, businesses, search engines, social media platforms, and other online marketing tools.

Search engines, such as Google® and Bing®, provide businesses that sell products and services online with analytics and management services to gain insight into past purchasing behavior of consumers. In particular, many search engines provide statistical insights into website traffic and behavior of platform users associated with online marketing campaigns. But none of these search engines generate AI personas that represent different segments of a target audience for a marketing campaign or simulate responses to the marketing campaign.

Certain social media platforms allow for targeted advertising based on user demographics and historical interests of users. However, these platforms do not create AI personas that represent these demographics nor do these platforms evaluate marking campaigns based on how AI personas would likely respond to the marketing campaigns.

Marketing automation platforms provide tools for managing a marketing campaign and track performance of the marketing campaign. However, these marketing automation platforms do not create AI personas that represent segments of a target audience or use AI personas to provide an evaluation of how various segments of the target audience would likely respond to the marketing campaign before the campaign is released.

Embodiments described herein provide an innovative solution to the problem of determining how a target audience is expected to respond to a marking campaign prior to release of the campaign by using generative AI models to create a plurality of diverse and realistic AI personas that represent different segments or demographics of the target audience. Traditional marketing methods often rely on statistical models that do not accurately represent the many different segments and demographics of a target audience for a marketing campaign. Methods described below employ generative AI models to generate AI personas based on data collected from a variety of data sources, including historical data, demographic information, and user behavior patterns. The AI personas are an accurate and comprehensive representation of the various segments of the target audience. The generative AI transformer models are trained on a vast amount of textual data collected from various sources, including social media platforms, online forums, customer reviews, and surveys. The methods include cleaning and preprocessing the textual data to remove irrelevant content and ensure the data is in a suitable format for training the generative AI models to generate the diverse and realistic AI personas.

Embodiments described below simulate responses of the AI personas to the marketing campaign using predictive AI models. The predictive AI models take into account the unique characteristics, preferences, and behaviors represented by each AI persona. The predictive AI models simulate the responses of the AI personas to the marketing campaign based on the patterns and relationships learned from the training data. The resulting responses provide a nuanced and accurate evaluation of the marketing campaign, reflecting the likely responses of different segments of the target audience represented by the AI personas.

Embodiments describe below use the AI personas to generate ratings for the marketing campaign and generate specific feedback for the marketing campaign. The technical details of this component involve the use of supervised learning model to generate ratings of the marketing campaign based on the simulated responses of the AI personas. In addition to the ratings, natural language processing (NLP) models are employed to generate feedback on the campaign. This feedback is composed of textual data that describes specific suggestions for improving the campaign. The user, such as a business or an advertiser, can use the responses, ratings, and feedback produced with various AI personas to obtain actionable insights that can be used to fine-tune the marketing campaign before the marketing campaign is distributed on social media platforms to the target audience.

Example Implementation of a Method for Evaluating Social Media Marketing Campaigns FIG. 1 depicts a high-level implementation of an automated AI-driven method 100 for evaluating a social media market campaign 102 before the market campaign is released on social media to a target audience. The marketing campaign 102 can be designed by a user, such as a business or an advertiser, who desires to know prior to releasing the marketing campaign on, for example, social media platforms how customers in different segments or demographics of the target audience can be expected to respond to the campaign 102. The marketing campaign 102 can be composed of, for example, captions that describe the product, descriptions of the products the user wants to advertise, hashtags, and images of the products.

In this example, the automated AI-driven method 100 retrieves textual data from a customer database 104. The database 104 contains textual data scraped from various textual data sources, including social media platforms, online forums, and/or customer reviews. The textual data records topics and preferences the target audience has recorded on various social media platforms, online forums, and customer reviews.

Block 106 represents a large language model (LLM) that receives the textual data of the database 104 as input and outputs a plurality of different AI personas 108. Each AI persona output from the LLM at block 106 contains textual data that represents a different segment or demographic of the target audience the user desires to send the market campaign 102 to on social media platforms of the target audience. For example, an AI persona records the age, gender, occupation, marital status, education, interests of the demographic, characteristics of the demographic, and preferences for certain products.

Block 110 represents AI models that generate responses, ratings, and feedback that each segment of the target audience is predicted to produce as a result of being presented with the marketing campaign 102. As shown in FIG. 1 at block 110, the AI models receive as input each AI persona and the marketing campaign 102 and out a corresponding response, rating, and feedback that each segment of the target audience is predicted to produce.

Block 112 represents aggregating the responses, ratings, and feedback for the different AI personas to form an evaluation of the marketing campaign.

Block 114 represents sending the evaluation to the user. The evaluation of the marketing campaign is configured to be used by the user to fine-tune the marketing campaign prior to sending the market campaign to social media platforms of the target audience. Having insights into how different segments of a target audience are expected to respond to and engage with a marking campaign before the marketing campaign is released is an enormous advantage to the user in terms of cost savings. The user is able to use the evaluation output from the AI-driven method 100 to fine-tune the marketing campaign and create better engagement with the target audience.

Figure 2:
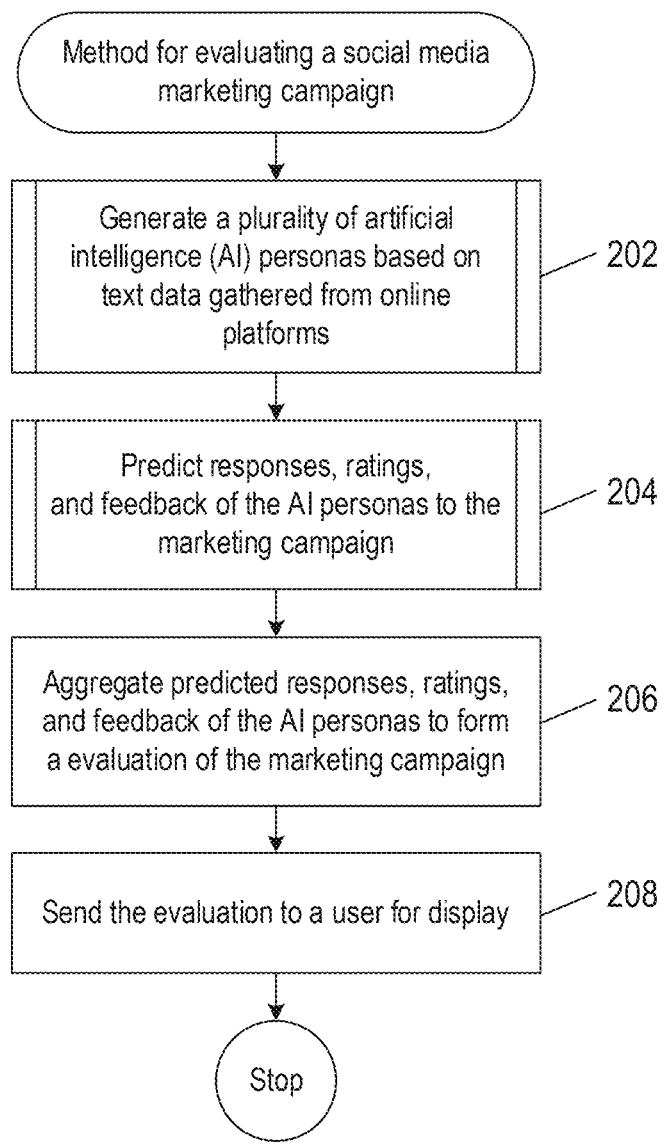
FIG. 2 is a flow diagram of an example method for evaluating a social media marketing campaign before the market campaign is released on social media.

FIG. 2 is a flow diagram of an example method for evaluating a social media marketing campaign before the market campaign is released on social media.

In block 202, a process for generating a plurality of artificial intelligence (AI) personas based on textual data gathered from online platforms is performed. An example implementation of a process according to block 202 is described below with reference to FIG. 3.

In block 204, a process for predicting responses, ratings, and feedback of the AI personas to the marketing campaign is performed. An example implementation of a process according to block 204 is described below with reference to FIG. 7.

In block 206, the predicted responses, ratings, and feedback of the different AI personas generated in block 204 are aggregated to form an evaluation of the marketing campaign. An example of forming an evaluation of the marketing campaign from the responses, ratings, and feedback of the different AI personas is described below with reference to FIG. 11.

In block 208, the evaluation is sent to the user over the internet. The evaluation enables the user to fine-tune the marketing campaign to engage with the different segments of the target audience prior to releasing the campaign on social media platforms of the target audience.

Figure 3:
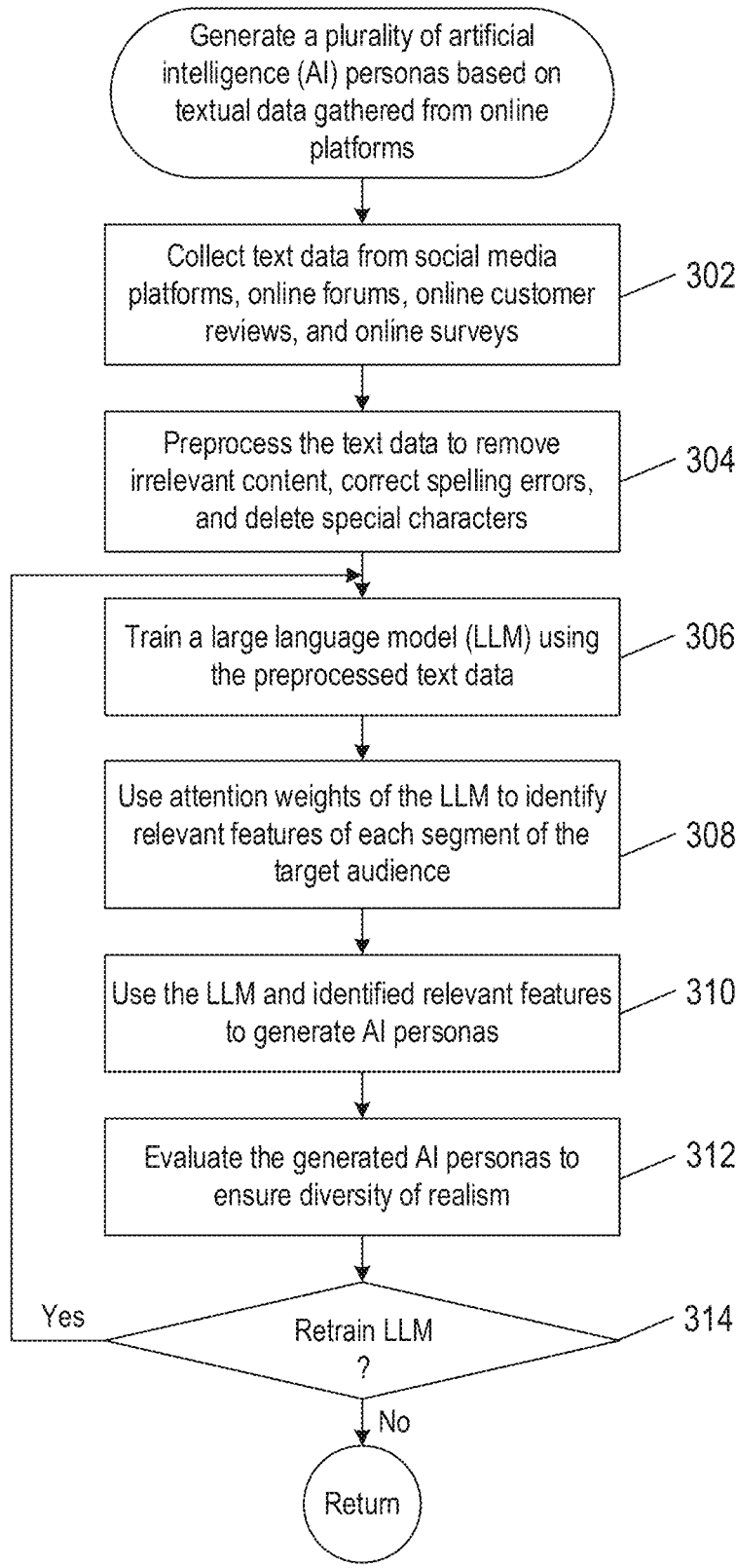
FIG. 3 is a flow diagram of a method for generating a plurality of AI personas performed in FIG. 2.

FIG. 3 is an example flow diagram of a process for generating a plurality of artificial intelligence (AI) personas based on textual data gathered from online platforms, such as performed in block 202 of FIG. 2.

In block 302, textual data is collected from social media, platforms, online forums, online customer reviews, and online surveys.

Figure 4:
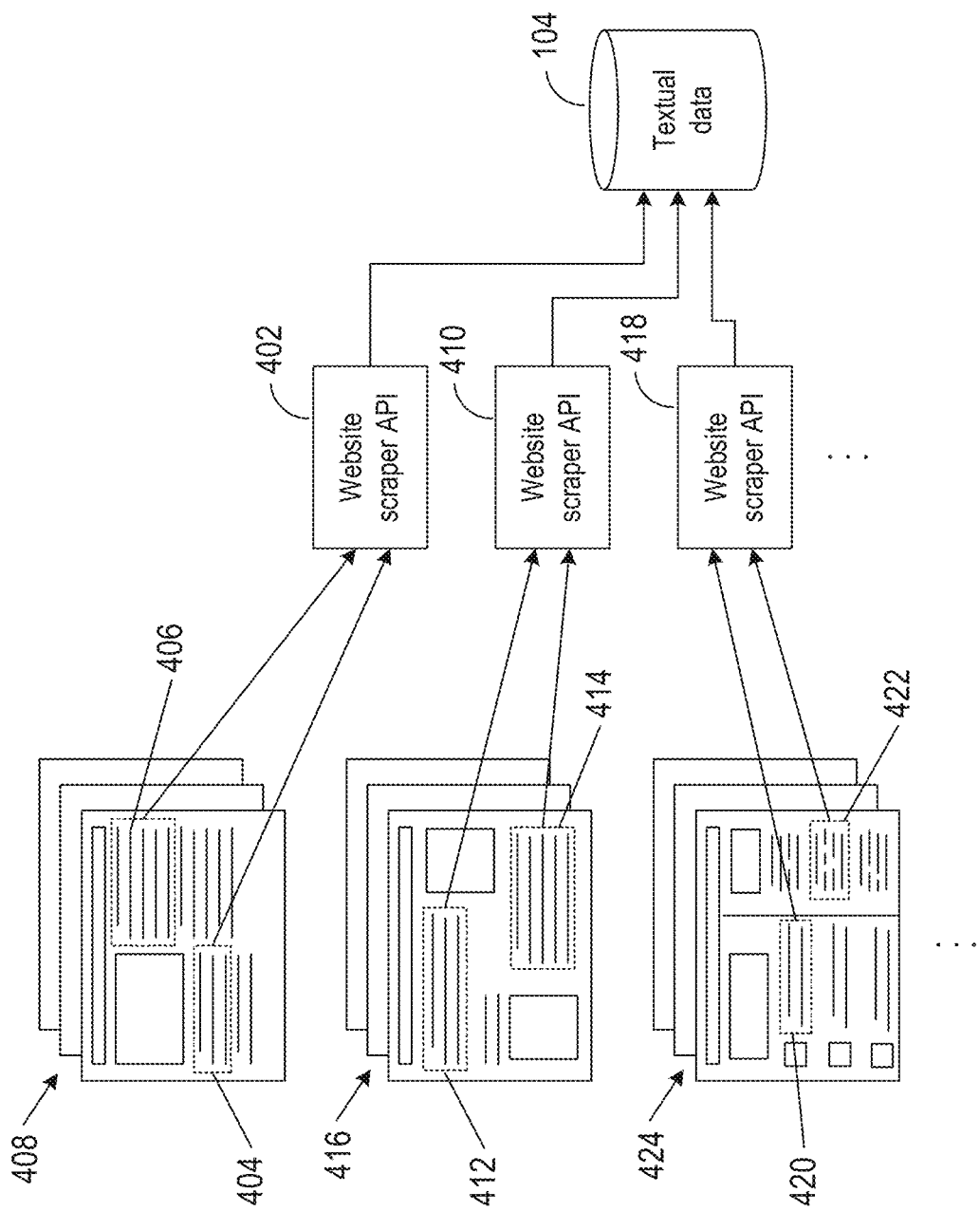
FIG. 4 depicts an example of collecting textual data from various data sources.

FIG. 4 depicts an example of collecting textual data from various data sources. The textual data can be collected in chunks using various website scraper application programming interfaces (APIs) that extract data from web pages using automated scripts or tools. For example, a first website scraper API 402 scrapes textual data 404 and 406 from web pages 408 of various social media platforms, such a Facebook® and Instagram®, and stores the data in the database 104. A second website scraper API 410 scrapes textual data 412 and 414 from web pages 416 of various online customer review platforms and stores the data in the database 104. A third website scraper API 418 scrapes textual data 420 and 422 from web pages 424 of various consumer online survey platforms and stores the data in the database 104. Textual data can be collected from other data sources, such as online surveys, using website scrapers that are configured to scrape textual data from online surveys.

Returning to FIG. 3, in block 304, the textual data collected from the various data source in block 302 is preprocessed to, for example, remove irrelevant content, correct spelling errors, and delete special characters (e.g., !, @, $, #, %, and &). The resulting preprocessed textual data can be used to train the LLM for AI persona generation.

Figure 5:
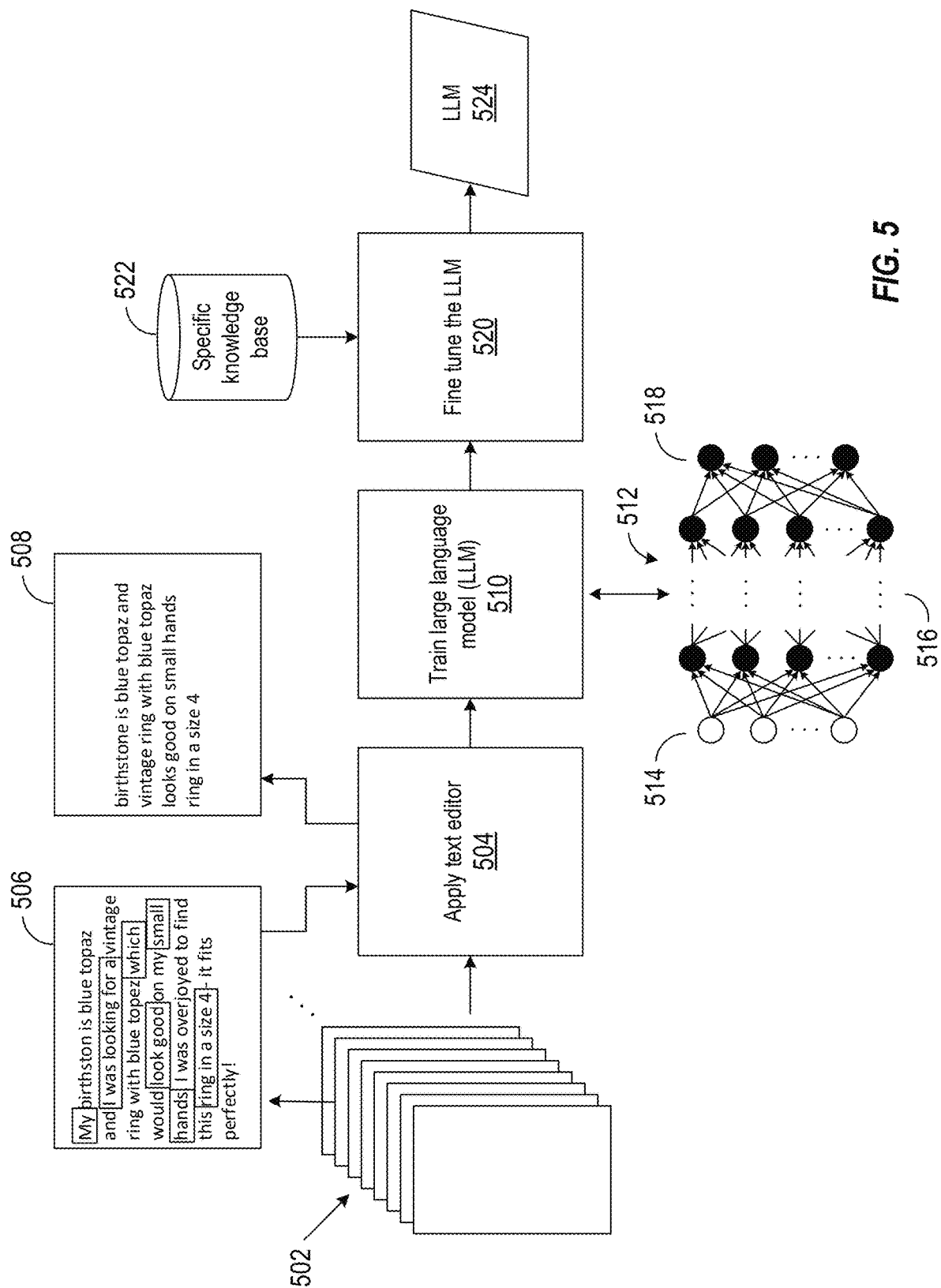
FIG. 5 depicts an example of preprocessing textual data and training a large language model (LLM) for AI persona generation.

FIG. 5 depicts an example of preprocessing textual data and training an LLM for AI persona generation based on preprocessed textual data. In block 504, the textual data 502 stored in the database 104 is input to a text editor to remove irrelevant content, correct spelling errors, handle special characters, and arrange the remaining textual data into a suitable format to obtain preprocessed textual data. FIG. 5 shows an example of a document 506 of textual data for an online review of a topaz ring provided as input sent to a text editor at block 504. In this example, applying the text editor in block 504 outputs relevant portions by correcting the misspelled word, "birthstone," and removing irrelevant content enclosed by rectangles to obtain preprocessed textual data 508. In block 510, the preprocessed textual data output from the text editor is used to train an LLM. The LLM can be a generative pre-trained transform 3 (GPT-3) or a bidirectional encoder representations from transformers (BERT) that is trained to recognize and generate text. The LLM is a neural network 512, called a transformer model, composed of an input layer of nodes 514, hidden layers of nodes 516, and an output layer of nodes 518. The nodes are connected be weights represented by lines. The weights determine the importance of any given input variable, with larger weights contributing more significantly to the output. In other words, larger weights signify that certain text or words input to the LLM have more importance than others. The LLM can respond to natural human language to answer an unstructured question or to prompt in a way that makes sense to human user. In block 520, the LLM obtained in block 510 is fine-tuned (i.e., prompt-tuned) to a specialized task of generating AI personas in response to a prompt for an AI persona. The LLM is fine-tuned on a smaller, specific knowledge data 522 of actual personas of people who use social media platforms. The resulting trained LLM 524 can then be used to generate AI personas of the target audience the user desires to send the marketing campaign in response to receiving prompts as input.

Returning to FIG. 3, in block 308, attention weights of the trained LLM generated in block 306 are used to identify relevant features of each segment of the target audience.

During training of the LLM, attention weights are assigned to different words or tokens in the input textual data. The attention weights help the LLM determine the importance of each word in the input textual data in the context of a given task, such as generating AI personas described below with reference to FIG. 6A or generating responses to marketing campaigns described below with reference to FIGS. 8A-8B. During LLM training, attention weights are generated for different words of the input textual data. The attention weights determine the level of importance each word contributes to the output of the LLM.

Attention weights are determined by embedding the words of the input textual data in vectors. The transformer architecture of an LLM includes an attention engine that operates on three main components for each word (i.e., vector) in the input textual data: a query, a key, and a value. The query represents the current word that is considered by the LLM. The key correlates all other words from the textual data that are connected to the query to determine relevance of the query. The value represents the actual content of the words that are connected to the query. Attention weights are calculated between the query and the keys by determining the dot product of the query with each key, which shows the compatibility or relevance of the query to each key. The attention weights are scaled and normalized through a softmax function to ensure the attention weights across all keys sum to one, signifying a probability distribution of attention. Each value is then multiplied by a corresponding attention weight (i.e., the softmax output), and the results are summed to produce the final output vector for the word represented by the query. The output vector contains weighted information from all relevant parts of the input textual data.

In the context of generating AI personas, the attention engine of the LLM 524 allows the LLM 524 to focus selectively on parts of the textual data that are more relevant for generating AI personas. For example, when generating AI personas, the LLM 524 can place more attention on words that indicate demographic features (e.g., age, occupation) or interests (e.g., fitness, technology). Attention weights significantly enhance the LLM's ability to generate accurate AI responses.

In block 310, the LLM and relevant features obtained in block 308 are used to generate AI personas that correspond to different segments or demographics of the target audience for the marketing campaign. A prompt and a set features related to a specific segment of the target audience are input the LLM. The LLM generates text that reflects the characteristics of an AI persona.

Figure 6A:
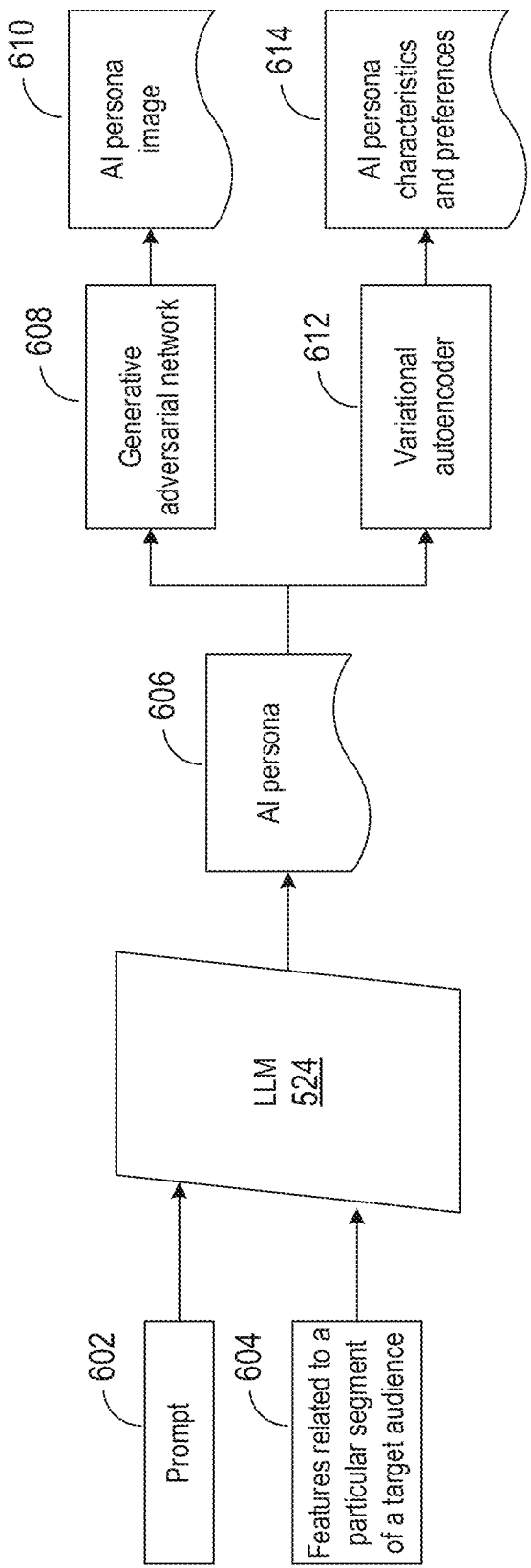
FIG. 6A depicts an example of using a trained LLM to generate an AI persona, an AI persona image, and identify characteristics and preferences of the AI persona.

FIG. 6A depicts an example of a prompt 602 and features 604 that relate to a particular segment of a target audience input the LLM 524 obtained in FIG. 5. The features, in this example, include age, gender, location, interests, and online behavior patterns. The features can be used to generate a diverse range of AI personas, each with a unique set of characteristics and preferences. For example, one AI persona might be a 25-year-old female from New York who is interested in fashion and spends a lot of time on the social media platform Instagram®. Another AI persona might be a 40-year-old male from San Francisco who is interested in technology and frequently reads technology blogs. These AI personas, with their unique characteristics and preferences, provide representations of different segments of the target audience, allowing for a more accurate evaluation of the marketing campaign against such target audiences. The LLM 524 outputs an AI persona 606 in response to receiving the prompt 602 and the features 604.

Figure 6B:
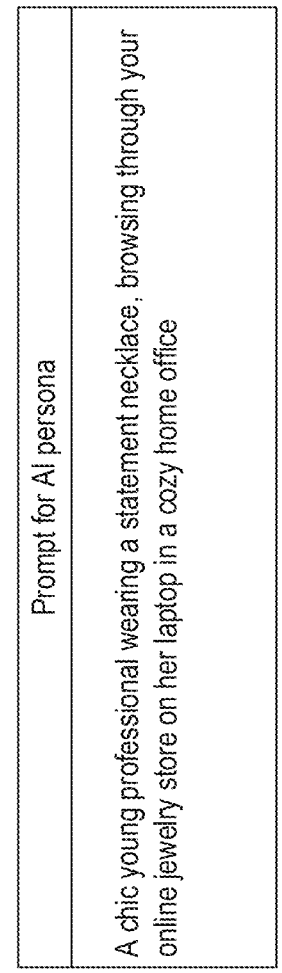
FIGS. 6B-6D depict an example prompt, AI persona, and image of the AI persona, respectively.

FIG. 6B depicts an example of a prompt that can be input to an LLM that has been trained to output AI personas representing different segments of target audience of online jewelry customers. In this example, the prompt describes a young professional female who is interested in online jewelry shopping.

Alternatively, an enhanced or more descriptive, prompt can be input to the LLM 524 to generate a more detailed AI persona. For example, a more descriptive prompt than the example prompt depicted in FIG. 6B may state "Generate an AI persona for a young professional female, between the ages of 25 and 35, who frequents online jewelry shops. She prefers contemporary jewelry styles within a moderate budget, often influenced by latest trends and influencer endorsements on social media platforms. She primarily purchases jewelry for self-adornment and occasionally as gifts." The more descriptive the prompt is the more detailed and accurate the AI persona output from the LLM 524.

Figures 6C, 6D:

FIG. 6C depicts an example of an AI persona output from the LLM in response to receiving the prompt in FIG. 6B. The AI persona embodies particular details and characteristics of a segment of the target audience. In this example, the AI persona output from the LLM is composed of detailed demographic information, such as a specific age, gender, occupation, marital status, and education level. The AI persona also describes behavioral information that characterize the shopping habits or preferences of the segment of the target audience represented by the AI persona.

In FIG. 6A, the AI persona 606 is input to a generative adversarial network 608 that generates a representative image of the AI persona 610. An example cartoon image of the AI persona is shown in FIG. 6D that substantially matches the description of a person represented by the AI persona in FIG. 6C. In this example, the representative image appears as a cartoon image. In practice, the representative image output from the generative adversarial network 608 may appear lifelike. In FIG. 6A, the AI persona 606 is also input to a variational autoencoder 612 that outputs persona characteristics and preferences of the AI persona 614.

Returning to FIG. 3, in block 312, the AI personas generated in block 310 are evaluated to ensure diversity and realism. The AI personas can be displayed in a computer display and compared to actual user data by domain experts. If the AI personas fail to accurately describe actual user data, the domain experts can restart the automated process of retraining and refining the LLM as indicated in block 314. In an alternative implementation, a machine learning model can be trained to classify AI personas as realistic or not realistic based on supervised learning using previously labeled AI personas.

AI personas that accurately represent different segments of the target audience can be used to evaluate the marketing campaign 102 and provide different insights for successfully fine-tuning the campaign. The methods describe below use the AI personas and predictive AI models to predict responses, ratings, and feedback to the marketing campaign 102 from different segments of the target audience represented by the AI personas.

Figure 7:
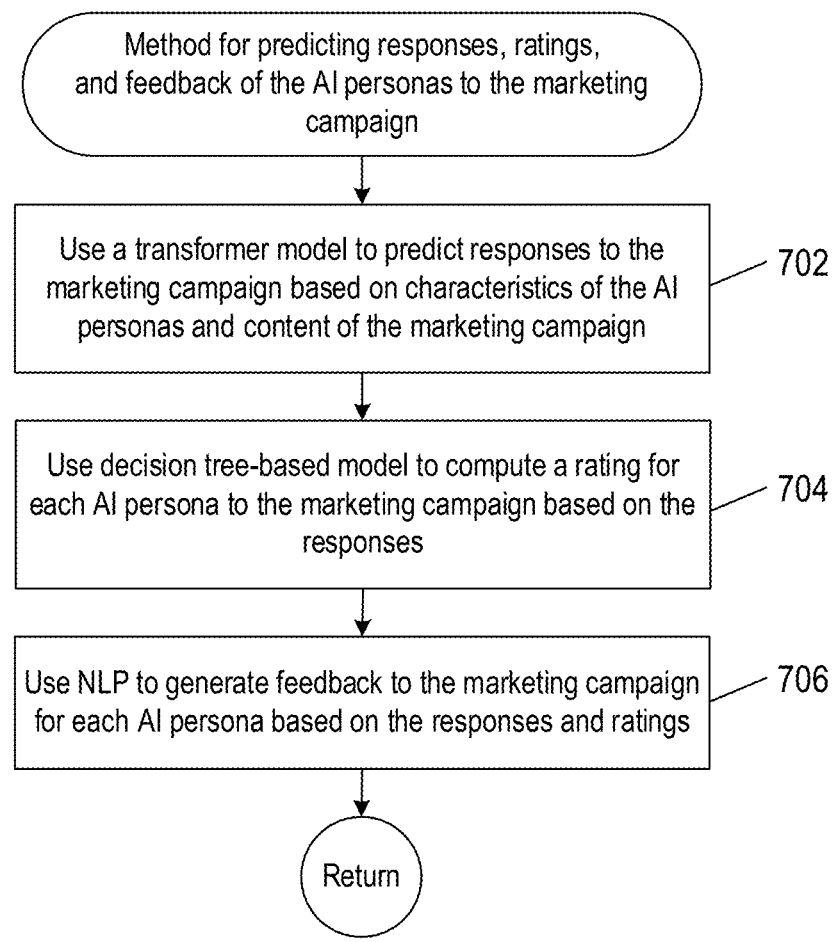
FIG. 7 is a flow diagram of a method for predicting responses, ratings, and feedback of AI personas to a market campaign.

FIG. 7 is a flow diagram of a method for predicting responses, ratings, and feedback of the AI personas to the market campaign.

In block 702, a transformer model predicts responses to the market campaign 102 based on characteristics of the AI personas and content of the marketing campaign 102. The transformer model can be, for example, a GPT-3 model or BERT model that is trained on a database of actual customer responses to various types of content of marketing campaigns. The resulting transformer model receives as input the characteristics, preferences, and behaviors of each AI persona to generate a corresponding realistic response to the content of the marketing campaign.

Figure 8A:
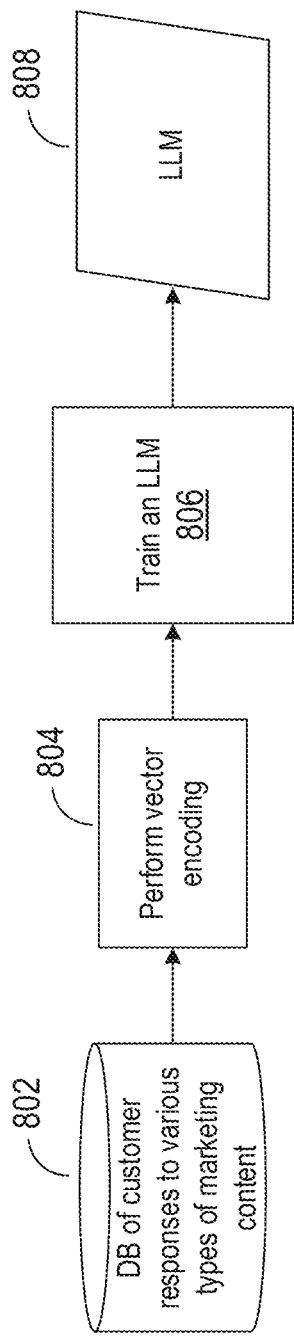
FIG. 8A depicts an example of training a transformer model to predict responses of the AI personas to content of the marketing campaign.

FIG. 8A depicts an example of training a transformer model based on textual data of actual customer responses to various types of content of different marketing campaigns stored in a database 802. In block 804, vector encoding is used to encode the content of the different marketing campaigns and actual customer responses extracted from the database 802 into vector representations of the content and the customer responses. In block 806, the vector representations are used to train a transformer architecture of an LLM 808 to receive as input customer responses to content of various types marketing campaigns and output corresponding realistic predicted response of a person to the content of the marketing campaign. In this context, the attention engine of the LLM 808 focuses selectively on parts of the input textual data that are more relevant for predicting responses. For example, in predicting responses to content of marketing campaigns, the LLM 808 can pay more attention to words or phrases that relate to user preferences and past behaviors that align with the content of the marketing campaign 102. This selective attention helps the LLM 808 to dynamically adapt responses based on the context of the marketing campaign material and the characteristics of a segment of the target audience. Attention weights significantly enhance the ability of the LLM 808 to generate accurate and targeted responses, making the responses to the marketing campaign more reliable and insightful.

Figure 8B:
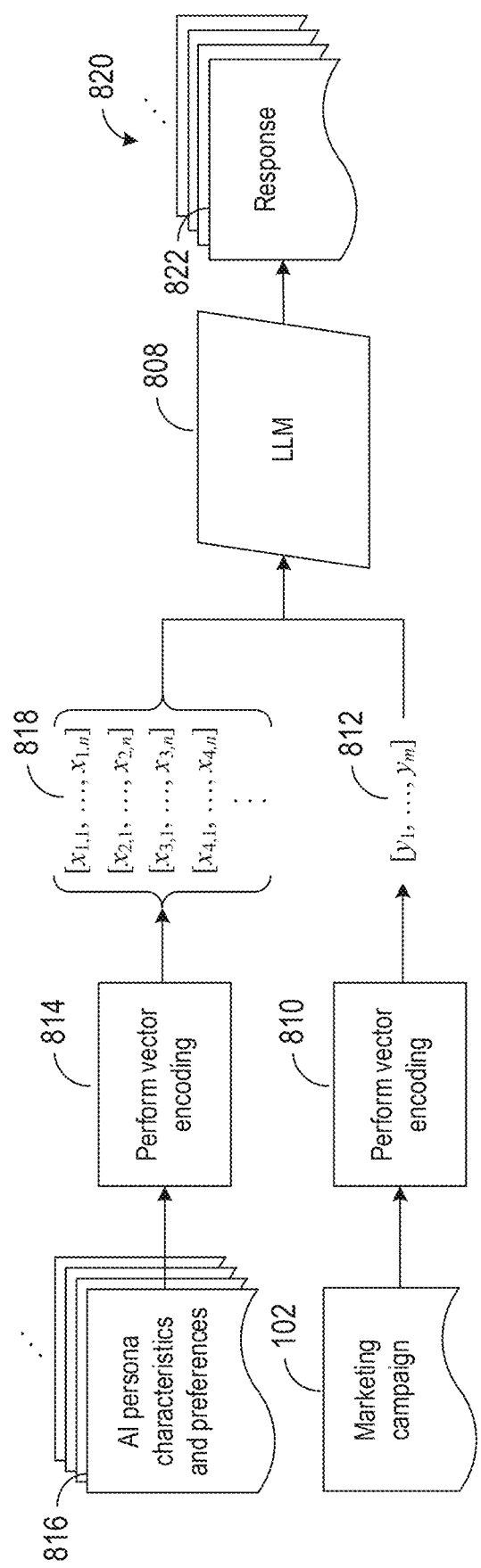
FIG. 8B depicts using the transformer model obtained in FIG. 8A to predict responses of the AI personas to content of the marketing campaign.

FIG. 8B depicts using the transformer model 808 to predict responses of the AI personas to content of the marketing campaign 102 of the user.

In block 810, vector encoding is performed to encode textual data of the marketing campaign 102 into a corresponding marketing campaign vector 812.

In block 814, vector encoding is performed to encode characteristics, preferences, and behavior of each AI persona obtained in FIG. 6B into a corresponding AI persona vector. For example, the characteristics, preferences, and behavior of AI persona 816 are encoded into an AI persona vector 818. Each AI persona vector and the marketing campaign vector 812 are input to the transformer model 808 to obtain corresponding responses 820 to content of the market campaign 102. The transformer model 808 has been trained to account for nuances of the characteristics, preferences, and behaviors of the various AI personas and generate appropriate corresponding responses.

For example, AI persona vector 818 and the marketing campaign vector 812 are input to the transformer model 808 to obtain response 822. Each response contains textual data that describes how a customer represented by an AI persona is predicted to respond to content of the marketing campaign 102. For example, if the content of the marketing campaign 102 contains technical terminology that is comprehended only by technical experts or tech-savvy customers, the predict AI response is negative for an AI persona representing an older, less tech-savvy customer. By contrast, the response of an AI persona that represents a young, tech-savvy customer might contain a positive or enthusiastic response to the same marketing campaign. The set of responses 820 are stored in a responses data storage.

Returning to FIG. 7, in block 704, a decision tree-based model is used to compute a rating for each AI persona to the marketing campaign 102 based on the responses obtained in block 702. The decision tree-based model can be a single decision tree or a random forest of decision trees that have been trained to generate a rating based on actual customer ratings of different marketing campaigns. A rating can be a numerical value, such as an integer value on a scale from one to ten. Alternatively, the rating can be categorical, such as poor, average, good, and excellent.

The random forests is trained using the technique of bootstrap aggregating. Given a training set of actual customer ratings of different marketing campaigns, the technique of bootstrap aggregating repeatedly selects a random sample with replacement of the actual customer ratings to fit a decision tree to the sample. This process of random sampling with replacement is repeated B times where B is the resulting number of trees in the random forest.

Figure 9:
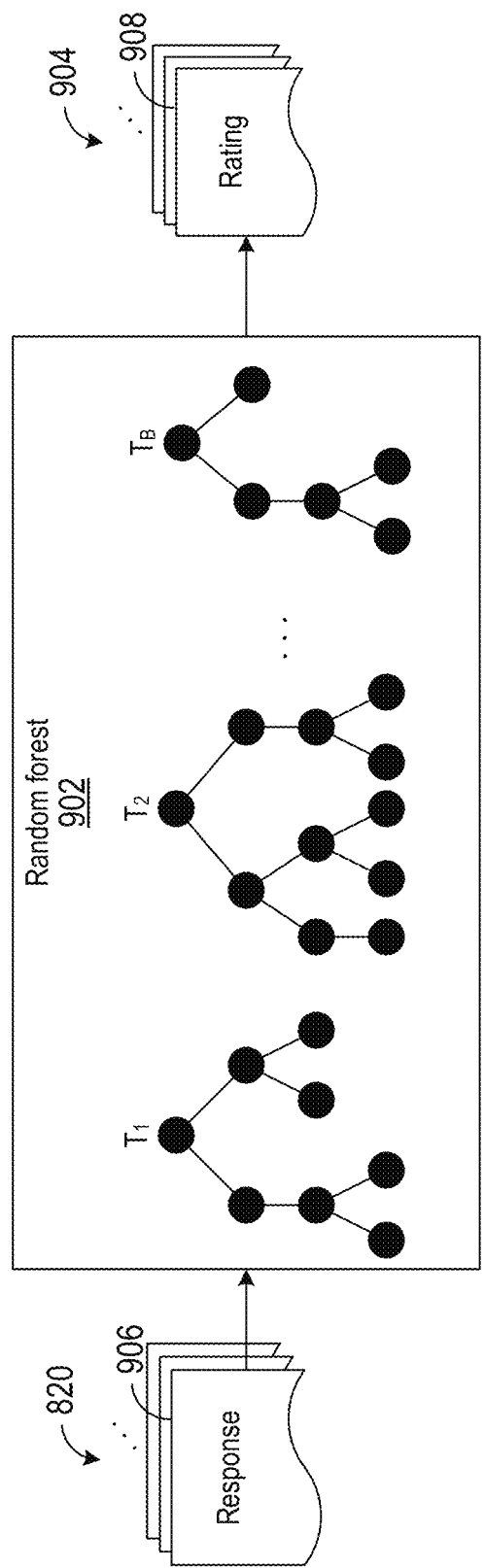
FIG. 9 depicts an example implementation of a random forest of decision trees to generate ratings of the AI personas to content of the marketing campaign.

FIG. 9 depicts an example implementation of a random forest 902 of B decision trees denoted by $T_m$, where b=1, ..., B. Each decision tree has been trained on a different randomized subset of actual customer ratings and customer responses to different marketing campaigns. The nodes of the decision trees of the random forest represent decision points that split the textual data of the responses into subgroups. In certain implementations, the nodes can be keywords. In other implementations, the nodes can be features derived from the textual data, such as responses to the marketing campaign. The root node and internal nodes of each decision tree can represent a "question" or a "decision" based on features from the textual data. For example, in a decision tree-based model that predicts customer ratings of a marketing campaign, one node may split the textual data based on the age range of the AI personas, another node may split the textual data based on the type of product interest shown, another node may split based on the sentiment expressed in the response, or other nodes may be engineered to split the textual data based on features extracted from the responses. Each node involves a condition that partitions the data that reaches the node into two or more subsets. For example, "Did the persona express a positive sentiment?" could be a binary split based on sentiment analysis of the response. Alternatively, a node in a decision tree might consider a feature like "sentiment score>0.5" and split the responses into those that meet this criterion and those that do not. Further down the tree, another node might evaluate a different feature, such as "mentions high price," leading to more refined subgroupings until a rating is determined at a leaf node based on these combined features.

In the decision trees, the features (criteria used at decision nodes) can be formed from various measurable attributes of the responses and from the AI personas. Examples of features include numerical features, categorical features, and derived features. Examples of numerical features include length of the response and count of positive words. Examples of categorical features include the primary topic of the response that has been identified using topic modeling techniques, such as latent Dirichlet allocation. Derived statistical features include sentiment scores, frequency of specific phrases or terms that are indicative of a preference or dislike.

If the basis of node decisions translated directly from text data are implemented, the decision is less about specific keywords and more about features extracted through processing of the textual data in the response, such as the presence of certain words that affect a broader quantifiable feature, overall sentiment, or topic categorization.

Each the trees terminate in leaf nodes that contain the output values, or ratings, that the decision tree-based model predicts based on the decisions made at higher nodes. The rating resulting from traversing each of the decision trees with the textual data of a response is denoted by $R_b$. For each response in the set of responses 906 (e.g., obtained from database 802 in FIG. 8B), each of the decision trees in the random forest 902 is traversed with the same response to obtain a rating from each of the decision trees. The ratings associated with the response are collected to form the set of ratings $$\{R_b\}_{b=1}^{B}.$$

For example, the rating 908 for the response 906 is obtained by traversing each of the decision trees in the random forest 902 with the response 906 to obtain a separate rating $R_b$ from each of the decision trees. If the decision trees have been trained to output numerical rating values, after traversal of the decision trees with a response, the ratings obtained from the B decision trees are averaged to obtain an overall rating for the response as follows:

$$\text{Rating} = \frac{1}{B}\sum_{b=1}^{B} R_b \quad (1)$$

Alternatively, if the decision trees have been trained to output categorical ratings, such as poor, average, good, and excellent, after traversal of the decision trees with a response, a count of each type of rating is determined and the rating with the most frequently count is the rating for the response:

$$\text{Rating} = \text{majority vote } \{R_b\}_{b=1}^{B} \quad (2)$$

The set of ratings 904 obtained for the set of response 820 are stored in a ratings data storage.

Returning to FIG. 7, in block 706, an NLP model has been trained to generate feedback to the marketing campaign 102 for each AI persona based on the responses and ratings. The NLP model can be a transformer model, such as GPT-3 or BERT, that has been trained with a set of actual customer responses, ratings, and feedback. The response and rating obtained for each AI persona as described above with reference to blocks 702 and 704 are input to the trained NLP model to obtain corresponding feedback to the marketing campaign 102. The feedback output from the NLP model contains textual data that provides specific suggestions that a customer represented by an AI persona would give for improving the marketing campaign 102. This feedback is composed of textual data that describes specific suggestions for improving the marketing campaign 102.

Figure 10:
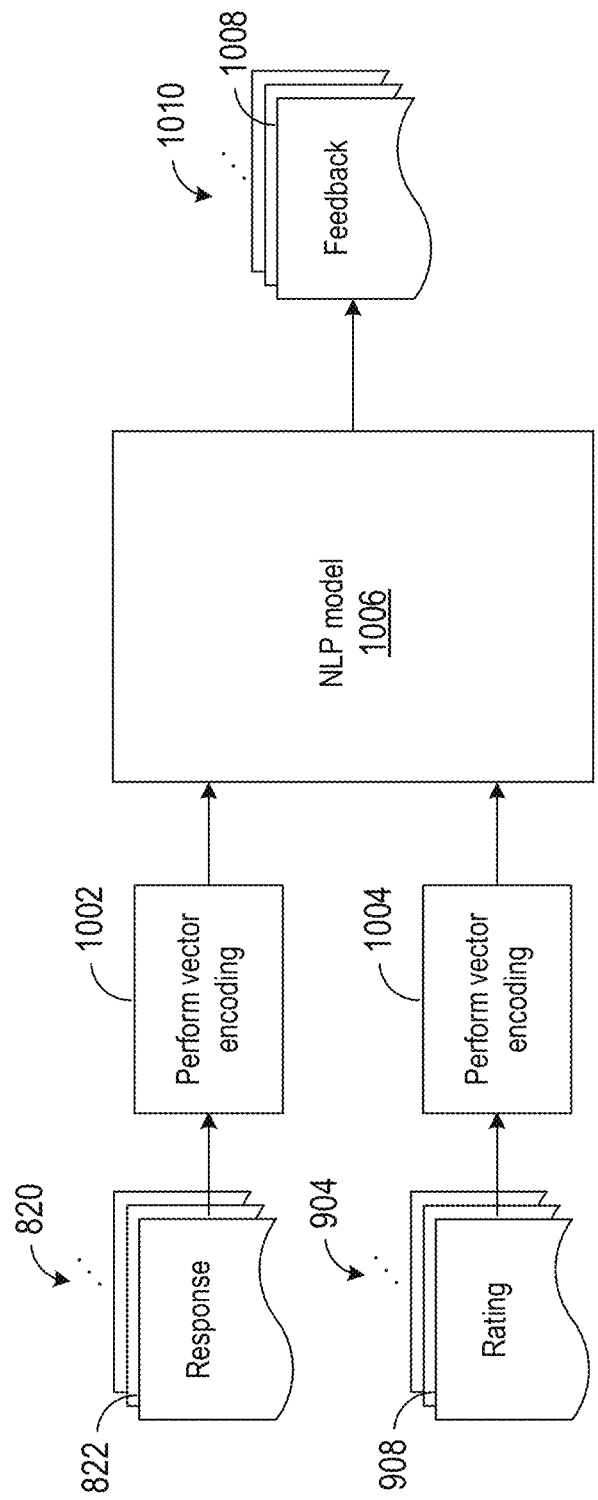
FIG. 10 depicts an example implementation of a natural language processing (NLP) model to generate feedback of the AI personas to the marketing campaign.

FIG. 10 depicts an example implementation of an NLP model used to generate feedback based on responses and ratings associated with each of the AI personas. Vector encoding 1002 is applied to each response of the set of responses 820 to obtain a corresponding vector encoded response. Vector encoding 1004 is applied to each rating of the set of ratings 904 to obtain a corresponding vector encoded rating. The vector encoded response and vector encoded rating that correspond to the same AI persona are input to the NLP model 1006 to obtain corresponding feedback 1008. The feedback are collected for each response and corresponding rating of an AI persona to form a set of feedback 1010, which is stored in feedback data storage. The feedback for each AI persona can vary. For example, the feedback for one AI persona can have a request for more engaging visuals. The feedback for another AI persona can have a suggestion for changing the language of the content of the marketing campaign 102 to better engage with the segment of the target audience represented by the AI persona.

Returning to FIG. 2, in block 206, the predicted responses, ratings, and feedback of the AI personas are aggregated to form an evaluation of the marketing campaign 102.

FIG. 11 depicts an example evaluation 1102 formed from the AI personas 1104, responses 820, ratings 904, and feedback 1010 of the AI personas. In this example, a first column contains the AI personas, a second column contains the responses, a third column contains the ratings, and a fourth column contains the feedback. Each row of the evaluation 1102 contains the response, rating, and feedback generated for one of the AI personas. Each row is an AI persona's reaction to the marketing campaign. For example, the first row of the evaluation 1102 contains the AI persona Emily of FIG. 6C in cell 1106, Emily's response to the marketing campaign 102 is in cell 1108, Emily's rating of the marketing campaign is in cell 1112, and Emily's feedback of the marketing campaign is in cell 1114. The evaluation is stored in an evaluation database 1116.

In another implementation, block 206 can include predicting advice for improving the marketing campaign 102 from an expert AI persona in social media marketing. The advice may include advice for making the content of social media marketing campaign more engaging with different segments of the target audience.

Figure 12A:
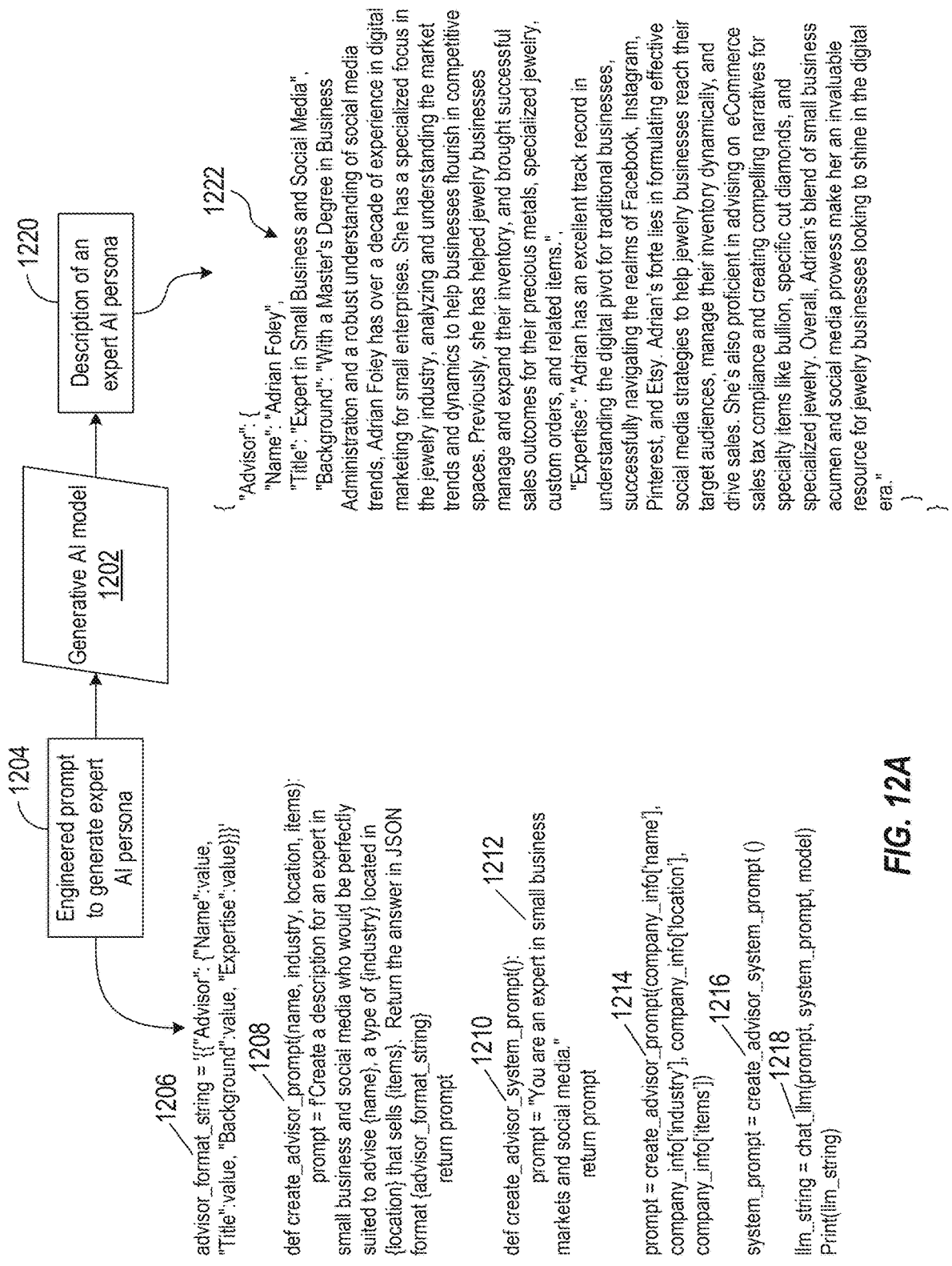

FIGS. 12A-12B depict an example of generating an expert AI persona in social media marketing. In FIG. 12A, a generative AI model 1202, such as GTP-3 or GPT-4, receives as input an engineered prompt 1204 that creates a description of an expert AI persona in social media marketing. In this example, the engineered prompt 1204 includes an advisor format string 1206 with parameters for the name, title, background, and expertise of an expert AI persona to be generated by the model 1202. The engineered prompt 1204 includes a function definition create advisor prompt 1208 composed a natural language instruction to a description of an expert with parameters for the name of the advice, industry, location, and items that are for sale and refers to the advisor format string 1206. The engineered prompt 1204 includes a function definition create advisor system prompt 1210 includes a description 1212 or the expert AI personas expertise. The function definition 1208 is executed in statement 1214 and the function definition 1210 is executed in statement 1216. The prompt 1214 includes instructions 1218 for outputting a description of an expert AI persona 1220 from the model 1202. FIG. 12A shows an example description of an expert AI persona 1222. In this example, the expert AI persona 1222 is an expert in stating social media marketing campaigns in the jewelry industry.

In FIG. 12B, the model 1202 is used to generate simulated expert advice from an expert AI persona in response to receiving AI persona reactions to the marketing campaign and the expert AI persona. In this example, the description of an expert AI persona 1220, such as the description of the expert AI persona 1222 in FIG. 12A, is input to an engineered advisor reaction 1226. FIG. 12B shows an example of an advisor reaction function composed of a system prompt 1228 and a prompt 1230. The expert AI persona 1222 can be input as the advisor 1232 in the engineered advisor reaction 1226. FIG. 12B shows an example of an engineered persona reaction 1234 composed of a system prompt 1236. The engineered persona reaction 1234 receives as input 1238 one or more AI persona reactions to the marketing campaign. As shown in FIG. 12B, the engineered persona reaction 1234 and engineered advisor reaction 1226 are input to the model 1202, which, in turn, outputs simulated expert advice 1240 for each of the AI personas input to the model 1202. For example, FIG. 12B shows an example of simulated expert advice 1242 for an AI persona "Paula." The AI persona "Paula" had a positive overall reaction to the marketing campaign. The expert advice 1242 advises creation of a testimonial-themed post showcasing real customer feedback.

Returning to FIG. 2, in block 208, the evaluation and/or expert advice is sent over the internet to the user.

Figure 13:
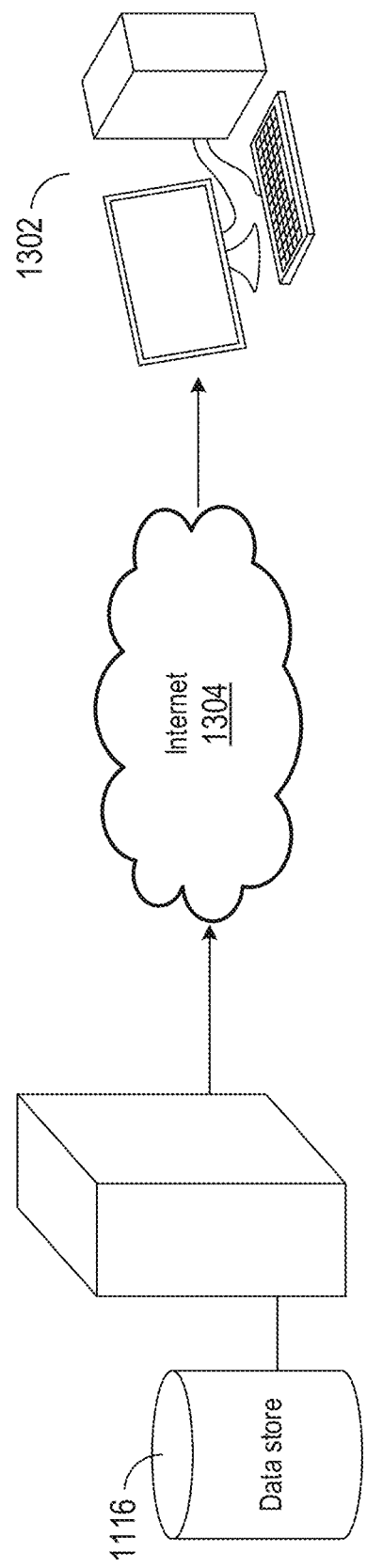
FIG. 13 depicts an example of sending the evaluation/expert advice stored in a database to a computer system of a user over the internet.

FIG. 13 depicts an example of sending the evaluation and advice stored in the database 1116 to a computer system 1302 of the user over the internet 1304. The evaluation can be displayed and user can use the evaluation to make changes or fine-tune the marketing campaign prior to sending the marketing campaign to social media platforms of the target audience. The evaluation provides the user with reliable insights into how different segments of a target audience are predicted to respond to and engage with the marking campaign 102 before the marketing campaign is released. Having such information is an enormous advantage to the user in terms of cost savings. The user is able to use the evaluation 1102 and advice to understand how different segments of the target audience can be expected to interpret the marketing campaign, enabling the user to fine-tune the marketing campaign to create better engagement with the target audience.

Figure 14:
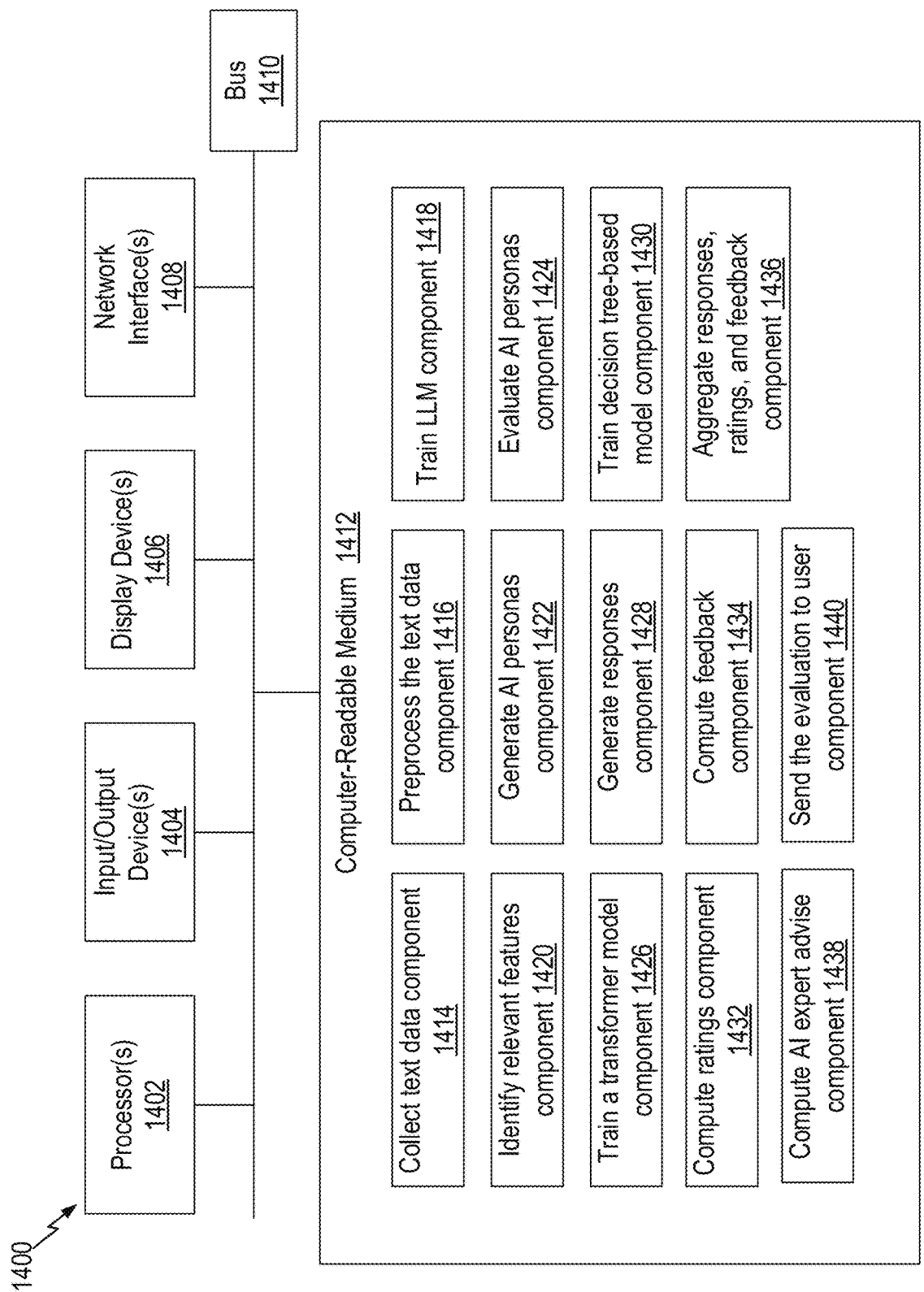
FIG. 14 depicts an example processing system with which aspects of the present disclosure can be performed.

Example Implementation of a Processing System for Evaluating Social Media Marketing Campaigns FIG. 14 depicts an example processing system 1400 configured to perform various aspects described herein, including, for example, the method for evaluating a social media market campaign before the market campaign is released on social media to a target audience as described above with reference to FIGS. 1-13.

Processing system 1400 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1400 includes one or more processors 1402, one or more input/output devices 1404, one or more display devices 1406, one or more network interfaces 1408 through which processing system 1400 is connected to one or more networks (e.g., a local network, an intranet, the Internet, or any other group of processing systems communicatively connected to each other), and computer-readable medium 1412. In the depicted example, the aforementioned components are coupled by a bus 1410, which may generally be configured for data exchange amongst the components. Bus 1410 may be representative of multiple buses, while only one is depicted for simplicity.

Processor(s) 1402 are generally configured to retrieve and execute instructions stored in one or more memories, including local memories like computer-readable medium 1412, as well as remote memories and data stores. Similarly, processor(s) 1402 are configured to store application data residing in local memories like the computer-readable medium 1412, as well as remote memories and data stores. More generally, bus 1410 is configured to transmit programming instructions and application data among the processor(s) 1402, display device(s) 1406, network interface(s) 1408, and/or computer-readable medium 1412. In certain embodiments, processor(s) 1402 are representative of a one or more central processing units (CPUs), graphics processing unit (GPUs), tensor processing unit (TPUs), accelerators, and other processing devices.

Input/output device(s) 1404 may include any device, mechanism, system, interactive display, and/or various other hardware and software components for communicating information between processing system 1400 and a user of processing system 1400. For example, input/output device(s) 1404 may include input hardware, such as a keyboard, touch screen, button, microphone, speaker, and/or other device for receiving inputs from the user and sending outputs to the user.

Display device(s) 1406 may generally include any sort of device configured to display data, information, graphics, user interface elements, and the like to a user. For example, display device(s) 1406 may include internal and external displays such as an internal display of a tablet computer or an external display for a server computer or a projector. Display device(s) 1406 may further include displays for devices, such as augmented, virtual, and/or extended reality devices. In various embodiments, display device(s) may be configured to display a graphical user interface.

Network interface(s) 1408 provide processing system 1400 with access to external networks and thereby to external processing systems. Network interface(s) 1408 can generally be any hardware and/or software capable of transmitting and/or receiving data via a wired or wireless network connection. Accordingly, network interface(s) 1408 can include a communication transceiver for sending and/or receiving any wired and/or wireless communication.

Computer-readable medium 1412 may be a volatile memory, such as a random access memory (RAM), or a nonvolatile memory, such as nonvolatile random access memory (NVRAM), or the like. In this example, computer-readable medium 1412 includes components that execute the operations described in the flow diagrams of FIGS. 2, 3, and 7.

In certain embodiments, a collect textual data component 1414 is configured to collect textual data from various data sources as described above with reference to block 302 of FIG. 3 and FIG. 4.

In certain embodiments, a preprocess the textual data component 1416 is configured to preprocess the textual data collected by the collect textual data component 1414 as described above with reference to block 304 of FIG. 3 and FIG. 5.

In certain embodiments, a train an LLM component 1418 is configured to train an LLM using the preprocessed data as described above with reference to block 306 of FIG. 3 and FIG. 5.

In certain embodiments, an identify relevant features component 1420 is configured to use attention weights of the LLM to identify relevant features of each segment of the target audience as described above with reference to block 308 of FIG. 3

In certain embodiments, a generate AI personas component 1422 is configured to use the LLM and the identified relevant features to generate AI personas as described above with reference to block 310 of FIG. 3 and FIG. 6A.

In certain embodiments, an evaluate AI personas component 1424 is configured to evaluate the AI personas to ensure diversity and realism as described above with reference to block 312 of FIG. 3.

In certain embodiments, a train a transformer model component 1426 is configured to train a transformer model that predicts AI persona responses to content of a marketing campaign as described above with reference to FIG. 8A.

In certain embodiments, a generate response component 1428 is configured to generate responses that predict how each of the AI personas respond to content of the marketing campaign as described above with reference to FIG. 8B.

In certain embodiments, a train a decision tree-based model component 1430 is configured to train a decision tree-based model to receive as input responses and generate a corresponding rating as described above with reference to FIG. 9.

In certain embodiments, a compute ratings component 1432 is configured to compute rates of the marketing campaign for each of the AI personas as described above with reference to FIG. 9.

In certain embodiments, a compute feedback component 1434 is configured to compute feedback of the AI personas to the market campaign as described above with reference to FIG. 10.

In certain embodiments, an aggregate responses, ratings, and feedback component 1436 is configured to aggregate the responses, ratings, and feedback as described above with reference to block 206 of FIG. 2 and FIG. 11.

In certain embodiments, a compute AI expert advice component 1438 is configure to generate expert advice regarding reactions from AI personas as described above with reference to FIGS. 12A-12B.

In certain embodiments, a send the evaluation to user component 1440 is configured to send the evaluation to a platform that enables the user to view the evaluation as described above with reference to block 208 of FIG. 2 and FIG. 13.

Note that FIG. 14 is just one example of a processing system consistent with aspects described herein, and other processing systems having additional, alternative, or fewer components are possible consistent with this disclosure.

Example Clauses

Implementation examples are described in the following numbered clauses:

Clause 1: A computer-implemented method, the method comprising: using a large language model (LLM) to generate a plurality of artificial intelligence (AI) personas, each AI persona representing a different segment of a target audience of a marketing campaign; using a transformer model, a decision tree-based model, and a natural language processing (NLP) to predict a response, a rating, and a feedback to the marketing campaign for each AI persona representing a different segment of the target audience; aggregating the predicted response, rating, and feedback for each AI persona representing a different segment of the target audience to form an evaluation of the marketing campaign for each segment of the target audience; and sending the evaluation of the marketing campaign to a user, wherein the evaluation of the marketing campaign is configured to be used by the user to fine-tune the marketing campaign.

Clause 2: The method of Clause 1, wherein using the LLM to generate the plurality of AI personas comprises: collecting textual data from one or more of social media platforms, online forums, online customer reviews, and online surveys; preprocessing the textual data to filter content based on one or more filtering rules, correct spelling, and delete special characters; identifying relevant features and attributes associated with the segments based on values of attention weights of the trained LLM; and evaluating the plurality of AI personas to ensure diversity of realism.

Clause 3: The method of any of Clauses 1-2, wherein collecting the textual data comprises executing automated website scraper application programming interfaces to automatically collect textual data from the one or more of the social media platforms, online forums, online customer reviews, and online surveys.

Clause 4: The method of any of Clauses 1-3, wherein using the transformer model, the decision tree-based model, and NLP to predict the response, the rating, and the feedback to the marketing campaign comprises: using the transformer model to predict the response to the marketing campaign for each AI persona based on characteristics of the AI persona and content of the marketing campaign; using the decision tree-based model to compute the rating of the marketing campaign for each AI persona based on the corresponding predicted Response to the marketing campaign for each AI persona; and using the NLP to generate the feedback to the marketing campaign for each AI persona based on the response and the rating associated with each AI persona.

Clause 5: The method of any of Clauses 1-4, wherein using the transformer model to predict the response to the marketing campaign comprises: using a vector encoder to encode the content of the marketing campaign into numerical vectors; using a vector encoder to encode characteristics of each AI persona into a corresponding numerical vector; and for each AI persona, using the transformer model to generate the predicted response to the marketing campaign based on the numerical vector representation of the AI persona and the numerical vector of the content of the marketing campaign.

Clause 6: The method of any of Clauses 1-5, wherein the trained decision tree-based model comprises a random forest of decision trees that generates a corresponding classification rating for each predicted response to the marketing campaign.

Clause 7: The method of any of Clauses 1-6, wherein the trained decision tree-based model comprises a random forest of decision trees that generates a corresponding numerical rating for each predicted response to the marketing campaign.

Clause 8: The method of any of Clause 1-7, further comprising: using a generative AI model to generate an expert AI persona in response to receiving an engineered prompt configured to generate the expert AI persona with an expertise in advertising products on social media platforms; using the generative AI model to generate simulated expert advice for improving the marketing campaign in response to receiving as input the expert AI persona and one or more AI persona reactions to the marketing campaign; and sending the expert advice to the user, wherein the expert advice is configured to be used by the user to fine-tune the marketing campaign.

Clause 9: A processing system, comprising: a memory comprising computer-executable instructions; and a processor configured to execute the computer-executable instructions and cause the processing system to perform a method in accordance with any one of Clauses 1-8.

Clause 10: A method, the method comprising: training a large language model (LLM) to generate a plurality of artificial intelligence (AI) personas based on textual data scraped from websites of online platforms, each AI persona representing a different segment of a target audience of a marketing campaign; training a transformer model to predict responses to the marketing campaign for each AI persona based on a dataset of user responses to various types of marketing content; training a decision tree-based model to generate a rating for each predicted response based on a dataset of user ratings to various types of marketing content; training a natural language processing (NLP) to generate feedback based on user feedback to responses and ratings of various types of marketing content; and using the trained LLM, the transformer model, the decision tree-based model, and the NLP to generate an evaluation of the marketing campaign by different segments of the target audience represented by the AI personas.

Clause 11: The method of Clause 10, wherein training the LLM comprises training the LLM to learn relationships between elements of the textual data.

Clause 12: The method of any of Clauses 10-11, wherein training the transformer model comprises training the transformer model to understand unique characteristics, preferences, and behaviors of each AI persona based on a dataset of user responses to various types of marketing content.

Clause 13: The method of any of Clauses 10-12, wherein training the decision tree-based model comprises training the decision tree-based model to assign a rating to marketing campaigns based on a dataset of user responses to various types of marketing content.

Clause 14: The method of any of Clauses 10-13, wherein training a natural language processing (NLP) comprises training the NLP to generate feedback to the marketing campaign based on user feedback to various types of marketing content.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for training machine learning models to generate artificial intelligence (AI) personas, the method comprising:
   training a large language model (LLM) to generate a plurality of AI personas based on textual data scraped from websites of online platforms, each AI persona representing a different segment of a target audience of a marketing campaign;
   training a transformer model to predict a set of responses to the marketing campaign for each AI persona based on a dataset of user responses to various types of marketing content;
   training a decision tree-based model to generate a rating for each predicted response of the set of responses based on a dataset of user ratings to various types of marketing content by:
      training a random a forest of decision trees by repeatedly selecting random samples with replacement from a training set of actual customer ratings and responses to marketing campaigns; and
      fitting as separate decision tree to each random sample to form a plurality of decision trees, wherein ach decision tree in the random forest is trained to split input data at nodes in the random forest based on features derived from the dataset of user responses and one or more AI personas and each decision tree is configured to output, at a leaf node, a rating for a given response,
      wherein, after training, the random forest is configured such that, for the given response, each decision tree outputs a respective rating, and a set of ratings from the plurality of decision trees are aggregated to produce an overall rating for the given response;
   training a natural language processing (NLP) model to generate feedback based on user feedback to responses and ratings of various types of marketing content; and
   using the LLM, the transformer model, the decision tree-based model, and the NLP model to generate an evaluation of the marketing campaign by different segments of the target audience represented by the plurality of AI personas.

2. The method of claim 1, wherein training the LLM comprises training the LLM to learn relationships between elements of the textual data.

3. The method of claim 1, wherein training the transformer model comprises training the transformer model to understand characteristics, preferences, and behaviors of each AI persona based on a dataset of user responses to various types of marketing content.

4. The method of claim 1, wherein training the NLP model comprises training the NLP model to generate feedback on the marketing campaign based on user feedback to various types of marketing content.

5. The method of claim 1, further comprising:
   using the transformer model to predict a respective response of the set of responses to the marketing campaign for each respective AI persona based on characteristics of the respective AI persona and content of the marketing campaign;
   using the decision tree-based model to compute the rating of the marketing campaign for each respective AI persona based on the respective response to the marketing campaign for each respective AI persona; and
   using the NLP model to generate the feedback on the marketing campaign for each respective AI persona based on the respective response and the rating associated with each respective AI persona.

6. The method of claim 5, wherein using the transformer model to predict the respective response to the marketing campaign comprises:
   using a vector encoder to encode the content of the marketing campaign into a set of numerical vectors;
   using a vector encoder to encode one or more characteristics of each respective AI persona into a corresponding numerical vector; and
   for each respective AI persona, using the transformer model to generate the respective response to the marketing campaign based on the corresponding numerical vector of the respective AI persona and the set of numerical vectors of the content of the marketing campaign.

7. The method of claim 5, wherein the decision tree-based model comprises a random forest of decision trees that generates a corresponding classification rating for each predicted response to the marketing campaign.

8. The method of claim 5, wherein the decision tree-based model comprises a random forest of decision trees that generates a corresponding numerical rating for each predicted response to the marketing campaign.

9. The method of claim 1, further comprising:
   using a generative AI model to generate an expert AI persona in response to receiving an engineered prompt configured to generate the expert AI persona with an expertise in advertising products on social media platforms;
   using the generative AI model to generate simulated expert advice for improving the marketing campaign in response to receiving as input the expert AI persona and one or more AI persona reactions to the marketing campaign; and
   sending the simulated expert advice to a user, wherein the simulated expert advice is configured to be used by the user to fine-tune the marketing campaign.

10. The method of claim 1, wherein the features comprising at least one of numerical features, categorical features, or derived statistical features, the numerical features including response length and count of positive words, the categorical features including primary topic identified by topic modeling, and the derived statistical features including sentiment scores and frequency of specific phrases.

11. A method for training a language model to generate artificial intelligence (AI) personas, the method comprising:
collecting textual data from a plurality of online sources associated with a plurality of segments of a target audience;
generating a first set of training data by processing the textual data by removing irrelevant content;
training the language model on the first set of training data by;
identifying a query that represents a current word of the first set of training data being considered by the language model;
identifying a key that correlates one or more words of the first set of training data that are connected to the query;
identifying a value that represents a set of content of the one or more words of the first set of training data that are connected to the query;
generating a set of attention weights based on the query, key, and value corresponding to each respective word of the first set of training data, wherein each attention weight of the set of attention weights determines an importance of a respective word of the first set of training data;
based on the set of attention weights, identifying one or more relevant features of the first set of training data for each segment of the plurality of segments of the target audience;
assigning higher attention weights to the one or more relevant features of the first set of training data than other features of the first set of training data not identified as the one or more relevant features;
fine-tuning the language model on a second set of training data comprising knowledge data representing one or more actual users of social media platforms; and
generating a set of AI personas using the language model based on the set of attention weights and the one or more relevant features for each segment of the target audience, wherein the language model places more attention on words included in the first set of training data that indicate demographic features and interests.

12. The method of claim 11, further comprising:
evaluating the set of AI personas to determine whether the set of AI personas are representative of a real, diverse set of users;
determining that the set of AI personas are not representative of the real, diverse set of users; and
retraining the language model.

13. The method of claim 11, wherein the one or more relevant features comprises one or more of: a demographic feature or an interest.

14. The method of claim 11, wherein generating the set of attention weights comprises determining a dot product between a query vector representing the query and a key vector representing the key.

15. The method of claim 11, further comprising scaling and normalizing the set of attention weights such that the set of attention weights across one or more keys sums to one.

16. The method of claim 11, wherein a value vector representing the value multiplied by its respective attention weight to generate a weighted value vector.

17. The method of claim 11, further comprising:
identifying a plurality of values;
generating a plurality of value vectors based on the plurality of values;
generating a plurality of weighted value vectors based on multiplying each value vector of the plurality of value vectors by its respective attention weight of the set of attention weights; and
aggregating the plurality of weighted value vectors to generate an output vector that comprises weighted information from relevant parts of the textual data.

18. A computing system comprising one or more processors and one or more memories storing computer-executable instructions that are executable by the one or more processors to cause the computing system to:
collect textual data from a plurality of online sources associated with a plurality of segments of a target audience;
generate a first set of training data by processing the textual data by removing irrelevant content;
train a language model on the first set of training data by;
identify a query that represents a current word of the first set of training data being considered by the language model;
identify a key that correlates one or more words of the first set of training data that are connected to the query;
identify a value that represents a set of content of the one or more words of the first set of training data that are connected to the query;
generate a set of attention weights based on the query, key, and value corresponding to each respective word of the first set of training data, wherein each attention weight of the set of attention weights determines an importance of a respective word of the first set of training data;
based on the set of attention weights, identify one or more relevant features of the first set of training data for each segment of the plurality of segments of the target audience; and
assign higher attention weights to the one or more relevant features of the first set of training data than other features of the first set of training data not identified as the one or more relevant features;
fine-tune the language model on a second set of training data comprising knowledge data representing one or more actual users of social media platforms; and
generate a set of AI personas using the language model based on the set of attention weights and the one or more relevant features for each segment of the target audience, wherein the language model places more attention on words included in the first set of training data that indicate demographic features and interests.

* * * * *